Nov. 17, 1959   O. A. SUENDERMANN ET AL   2,913,264
FLEXIBLE PIPE COUPLING MEANS COMPRISING
A COMPRESSION SEAL COMPONENT
Filed Feb. 28, 1955

INVENTORS
OTTO A. SUENDERMANN
HAROLD J. SOGN
BY
Bruce & Brosler
THEIR ATTORNEYS

United States Patent Office 2,913,264
Patented Nov. 17, 1959

2,913,264

FLEXIBLE PIPE COUPLING MEANS COMPRISING A COMPRESSION SEAL COMPONENT

Otto A. Suendermann, Berkeley, and Harold J. Sogn, Oakland, Calif.

Application February 28, 1955, Serial No. 490,728

2 Claims. (Cl. 285—342)

Our invention relates to couplings and more particularly to pipe couplings.

Among the objects of our invention, are:

(1) To provide a novel and improved pipe coupling;

(2) To provide a novel and improved pipe coupling involving a minimum of parts and which are capable of co-operating to provide a liquid tight seal;

(3) To provide a novel and improved pipe coupling capable of being coupled and uncoupled without affecting its sealing ability;

(4) To provide a novel and improved pipe coupling of simple construction, capable of being economically manufactured.

Additional objects of our invention will be brought out in the following description of a preferred embodiment of the same, taken in conjunction with the accompanying drawings, wherein.

Figure 1:
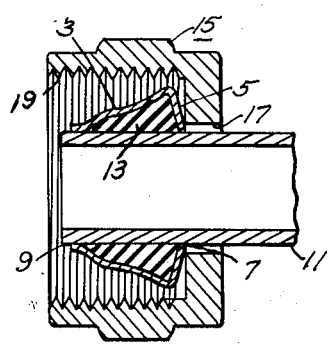
Fig. 1 is a view in section through a portion of a coupling of the present invention and depicting the same in the process of installation.
Figure 2:
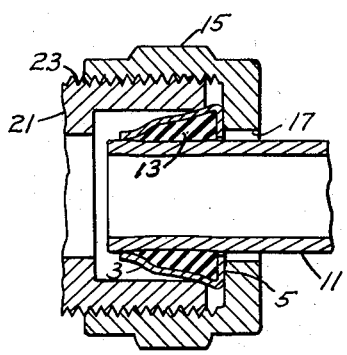
Fig. 2 is a view in section through such coupling after completion of installation.
Figure 3:
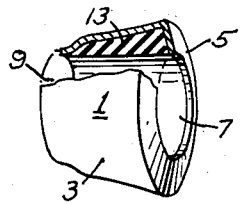
Fig. 3 is a three dimensional view of the sealing component of the coupling of the present invention.

Referring to the drawings for details of our invention in its preferred form, the same involves a compression seal component 1 including a hollow substantial frusto-conical shell 3 of soft deformable material, preferably of copper or the like, such shell in the preferred form, having a convex base 5 and axial aligned holes 7 and 9 therein, each of a diameter at least sufficient to permit sliding of the shell onto the end of the pipe 11 with which the coupling is to be used.

The interior of the hollow shell is filled with a sealing material or packing 13 to substantially the diameter of each of the holes, leaving a pipe passage through the component.

In conjunction with such compression seal component, we provide means for deforming this component into a tight sealing fit about the pipe passing therethrough, such means including a locking nut 15 having a central opening 17 exceeding in diameter the diameter of the pipe, and an internally threaded flange 19 somewhat larger in diameter than the maximum diameter of the compression sealing component. This locking nut is adapted to receive a hollow substantially cylindrical fitting having an external thread 23, adapting the fitting to be threaded into the flange of the locking nut, the fitting having an internal diameter corresponding to an intermediate diameter of the frusto-conical compression seal component.

In the preferred embodiment illustrated in the drawings, the sealing material is preferably in the form of a sleeve of rubber, about which the outer shell has been formed.

In utilizing the coupling of the present invention for its intended purpose, the locking nut is first assembled onto the end of the pipe which is to be coupled, with the flange of the nut directed toward the end of the pipe. This is followed by the compression seal component which is slipped onto the pipe with its small end also directed toward the end of the pipe. The fitting which is affixed to the end of the other pipe or the like to which the first pipe is to be coupled, is then inserted into the space between the compression seal component and the locking nut, following which the locking nut is threaded onto the fitting to the point where the fitting engages the conical surface of the sealing component and the locking nut engages and bears against the base thereof. The combination of forces thus engendered and acting against the compression sealing component, serves to reduce the volume of the shell thereby causing the sealing material therein to pressure engage with considerable force, that section of the pipe which it encircles. This results in a tight fit between the sealing component and the pipe which due to the deformation of the shell and resiliency of the packing, is maintained even upon subsequent removal of the locking nut. Thus under no circumstances can there be a leakage between the sealing component and the pipe, and insofar as any possibility of leakage around the sealing component, this is precluded by the edge engagement of the fitting with the conical wall of the shell and the surface contact under pressure, between the locking nut and the base of the sealing component.

In forming the outer shell about the sealing material, we prefer to accomplish this through a rolling operation, during which the opening at the apex of the shell might be made to provide a closer fit with the pipe when the sealing component is installed. With such closer fit, the tendency of the packing to squeeze out at this point during installation of the coupling will be minimized.

The diameter of the hole through the base end may be a trifle larger, in view of the fact that the hole edge of the base will, due to the convex character of the base, be brought closer to the pipe during compression by the locking nut. This is not essential however, as this edge of the base could be deformed against the pipe if desired. Inasmuch as the packing material will be retained within the shell by the base at this end of the sealing component, the size of the pipe opening in the locking nut is not critical, and in fact may be substantially larger than the outside diameter of the pipe.

It will be apparent from the foregoing description of our invention in its preferred form, that the same fulfills all the objects of our invention, and while we have illustrated and described this in its preferred form and in considerable detail, the invention as thus depicted is subject to alteration and modification without departing from the underlying principles, and we accordingly, do not desire to be limited in our protection to the specific details so illustrated and described except as may be necessitated by the appended claims.

We claim:

1. Means for coupling a pipe or its equivalent to another pipe or its equivalent in a flow connection comprising, a compression seal component involving a hollow substantially frusto-conical shell of soft deformable material, said shell having a convex base and axially aligned holes, and a continuous unbroken surface area, a packing of resilient sealing material filling said shell to substantially the diameter of each of said holes, leaving a pipe passage through said compression seal component, and means for deforming said compression seal component into a self-maintaining leak tight fit about a pipe passing therethrough, said means including a locking nut having a central opening exceeding in diameter the diameter of such pipe, and an internally threaded flange of an internal diameter exceeding that of the maximum diameter of said compression seal component, and a hollow cylindrical fitting adapted to thread into said locking nut and having an internal diameter corresponding to an intermediate diameter only, of said frusto-conical compression seal component.

2. Means for coupling a pipe or its equivalent to another pipe or its equivalent in a flow connection comprising, a compression seal component involving a hollow substantially frusto-conical shell of soft deformable material, said shell having a convex base and axially aligned holes, and a continuous unbroken surface area, each of said holes being of a diameter sufficient to permit sliding of the shell onto the end of a pipe to be coupled, a packing of resilient sealing material filling said shell to substantially the diameter of each of said holes, leaving a pipe passage through said compression seal component, and means for deforming said compression seal component into a self-maintaining leak tight fit about a pipe passing therethrough, said means including a locking nut having a central opening exceeding in diameter the diameter of such pipe, and an internally threaded flange of an internal diameter exceeding that of the maximum diameter of said compression seal component, and a hollow cylindrical fitting adapted to thread into said locking nut and having an internal diameter corresponding to an intermediate diameter only, of said frusto-conical compression seal component.

References Cited in the file of this patent

UNITED STATES PATENTS

| | | |
|---|---|---|
| 1,357,219 | Brewster | Nov. 2, 1920 |
| 1,586,793 | Fowler | June 1, 1926 |
| 1,978,047 | Haury | Oct. 23, 1934 |
| 2,038,629 | Bates | Apr. 28, 1936 |
| 2,087,920 | Mascuch | July 27, 1937 |
| 2,341,164 | Shimek | Feb. 8, 1944 |
| 2,476,597 | Hagan | July 19, 1949 |